(12) United States Patent
Murakami et al.

(10) Patent No.: US 10,270,318 B2
(45) Date of Patent: Apr. 23, 2019

(54) ELECTRIC MOTOR WITH ROTOR, CIRCUIT BOARD AND IMPROVED LEAD WIRE CONNECTION

(71) Applicant: FUJITSU GENERAL LIMITED, Kawasaki-shi, Kanagawa (JP)

(72) Inventors: Masanori Murakami, Kawasaki (JP); Tsugiyoshi Ono, Kawasaki (JP); Masaki Yamada, Kawasaki (JP); Shingo Suzuki, Kawasaki (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 727 days.

(21) Appl. No.: 14/376,508

(22) PCT Filed: Mar. 29, 2013

(86) PCT No.: PCT/JP2013/059473
§ 371 (c)(1),
(2) Date: Aug. 4, 2014

(87) PCT Pub. No.: WO2013/147126
PCT Pub. Date: Oct. 3, 2013

(65) Prior Publication Data
US 2015/0015101 A1  Jan. 15, 2015

(30) Foreign Application Priority Data

Mar. 29, 2012  (JP) .................................. 2012-076779

(51) Int. Cl.
*H02K 11/33* (2016.01)
*H02K 21/14* (2006.01)
(Continued)

(52) U.S. Cl.
CPC .............. *H02K 11/33* (2016.01); *H02K 5/225* (2013.01); *H02K 11/30* (2016.01); *H02K 21/14* (2013.01);
(Continued)

(58) Field of Classification Search
CPC ........ H02K 11/30; H02K 11/33; H02K 11/38; H02K 5/225; H02K 2211/03; H02K 1/27; H02K 21/14; H02K 2203/03
(Continued)

(56) References Cited

U.S. PATENT DOCUMENTS 4,850,812 A * 7/1989 Voight ................... F04B 17/03
310/68 R
5,877,574 A * 3/1999 Molnar .................. H02K 1/165
310/156.05
(Continued)

FOREIGN PATENT DOCUMENTS

EP       1403976 A1    3/2004
EP       2546959       1/2013
(Continued)

OTHER PUBLICATIONS

International Search Report dated Jun. 25, 2013, Application No. PCT/JP2013/059473; English Translation Included.
(Continued)

*Primary Examiner* — Bernard Rojas
*Assistant Examiner* — Alexander A Singh
(74) *Attorney, Agent, or Firm* — Rankin, Hill & Clark LLP

(57) ABSTRACT

An electric motor includes: a rotating shaft; a rotor securely attached to the rotating shaft and including a cylindrical magnet portion; a stator formed in an annular shape on an outer peripheral side of the rotor; a board installed above the rotor and the stator with a predetermined air gap therefrom; and a lead wire connected to the board. A connecting portion of the board and the lead wire is formed at a position on an inner side of an axial projection plane of the magnet portion of the rotor above the board. In this electric motor, even when the rotor is increased in diameter, the connecting portion of the lead wire connected to the board can be prevented from being located proximate to an upper part of the magnet portion of the rotor.

14 Claims, 4 Drawing Sheets

(51) Int. Cl.
*H02K 11/30* (2016.01)
*H02K 5/22* (2006.01)

(52) U.S. Cl.
CPC ...... *H02K 2203/03* (2013.01); *H02K 2211/03* (2013.01)

(58) Field of Classification Search
USPC .................................................. 310/68 R, 71
See application file for complete search history.

(56) References Cited

U.S. PATENT DOCUMENTS

| | | | | |
|---|---|---|---|---|
| 5,932,942 A | * | 8/1999 | Patyk | .................... H02K 11/33 310/58 |
| 5,932,943 A | * | 8/1999 | Werner | ...................... B62J 6/12 310/156.12 |
| 2003/0086800 A1 | * | 5/2003 | Kurihara | ............... F04C 23/008 417/423.7 |
| 2004/0063345 A1 | | 4/2004 | Eppler | |
| 2004/0183386 A1 | * | 9/2004 | Kuwert | .................... H02K 3/50 310/89 |
| 2007/0216243 A1 | * | 9/2007 | Agematsu | .............. H02K 7/083 310/90 |
| 2012/0153750 A1 | * | 6/2012 | Kim | ....................... H02K 3/522 310/71 |

FOREIGN PATENT DOCUMENTS

| | | |
|---|---|---|
| JP | 01-308153 | 12/1989 |
| JP | 04-012654 | 1/1992 |
| JP | 08-223842 | 8/1996 |
| JP | 09-037512 | 2/1997 |
| JP | 2010-273525 | 12/2010 |
| WO | 2011/111188 | 9/2011 |

OTHER PUBLICATIONS

Chinese Office Action dated Dec. 31, 2015 for the corresponding Chinese Patent Application No. 201380010038.0, and its English translation thereof.

European Office Action dated Feb. 28, 2017 for the corresponding European Patent Application No. 13767546.8.

\* cited by examiner (a)

(b)

(a)

(b)

ELECTRIC MOTOR WITH ROTOR, CIRCUIT BOARD AND IMPROVED LEAD WIRE CONNECTION

TECHNICAL FIELD

The present invention relates to an inner rotor electric motor in which a rotor is coaxially disposed at the center of a stator, and more particularly to a lead wire connection in a case where the outer diameter of the rotor is increased without changing the outer dimensions of the electric motor as a whole.

BACKGROUND ART

Heretofore, there is an inner rotor electric motor in which a rotor is coaxially disposed at the center of a stator. FIG. 3 illustrates the configuration of an electric motor as a conventional art, where (a) is a plan view and (b) is a cross section view. FIGS. 3(a) and (b) illustrate a radial air gap electric motor. The radial air gap electric motor includes a rotor 12 formed of a cylindrical permanent magnet and disposed on the inner peripheral side and a doughnut-shaped stator 13 disposed on the outer peripheral side with respect to a rotating shaft 11.

As illustrated in FIG. 3(b), a bearing portion 14 for securing the rotating shaft 11 includes a ball bearing 141 and a bearing housing 142. The ends of the bearing housing and the entire annular stator 13 are integrally molded and secured with a synthetic resin 15. The rotating shaft 11 integrated with the rotor 12 and the ball bearing 141 press-fit in the rotating shaft 11 are inserted into the bearing housing 142. Thus, a magnet portion 121 of the rotor 12 is disposed proximate to and opposite the inner side of the annular stator 13. In this state, as illustrated in FIGS. 3(a) and (b), a board 16 is disposed from above. On the board 16, there are formed a wiring pattern for supplying electric power to a control IC 20 disposed on the board 16, and a wiring pattern for supplying electric power to the windings of the stator 13 via the control IC 20. To the board 16, lead wires 18 bundled by a bushing 17 secured on an outer peripheral portion above the stator 13 are connected by soldering or the like. The lead wires 18 are used for supplying electric power to the electric motor.

Hence, there is known an electric motor having windings connected to each other using a board provided with cut-outs at edges thereof and formed in a substantially rectangular shape (see, for example, Patent Literature 1). FIG. 3 illustrates the electric motor using such a board with a substantially rectangular shape.
PATENT LITERATURE 1: JP 08-223842 A

SUMMARY OF INVENTION

Problems to be Solved by the Invention

In the electric motor illustrated in FIG. 3, in order to increase output without changing the outer dimensions, it is effective to increase the outer diameter of the rotor 12. When the outer diameter of the rotor 12 is increased, the radial dimension of the stator 13 becomes relatively small. As a result, the space above the stator 13 where the bushing 17 is attached becomes narrower. In this state, if the positioning of connecting portions 19 of the lead wires 18 with respect to the board 16 according to the conventional art is used, the connecting portions 19 would be disposed proximate to the upper part of the magnet portion 121 of the rotor 12, as illustrated in FIG. 4. If the electric motor is rotated in such state, there is the risk of causing a short-circuit between adjacent connecting portions 19 via the magnet portion 121 of the rotor 12, or a spark.

In order to solve the problems of short-circuit and spark, the connecting portions 19 may be moved to the outside by a distance corresponding to the increase in the outer diameter of the rotor 12. However, because the space above the stator 13 is narrow as it is, it is difficult to install the bushing 17 and additionally dispose the connecting portions 19 in the space.

Further, in order to dispose the connecting portions 19 in the space above the stator 13, the board 16 needs to be extended over the stator 13. As a result, the area of the board 16 is increased, or the shape of the board 16 becomes complex, reducing processability and material yield. Thus, there is the problem of increased cost of the board 16.

The present invention was made in view of the above problems. The purpose of the present invention is to provide an electric motor capable of preventing the connecting portions 19 of the lead wires 18 connected to the board 16 from being located proximate to the upper part of the magnet portion 121 of the rotor 12, and capable of improving processability and yield of the board 16, even when the diameter of the rotor is increased.

Solutions to the Problems

An electric motor according to claim 1 in the present invention includes: a rotating shaft; a rotor securely attached to the rotating shaft and including a cylindrical magnet portion; a stator formed in an annular shape on an outer peripheral side of the rotor; a board installed above the rotor and the stator with a predetermined air gap therefrom; and a lead wire connected to the board, wherein a connecting portion of the board and the lead wire is formed at a position on an inner side of an axial projection plane of the magnet portion of the rotor above the board.

In the electric motor according to claim 2 in the present invention, in addition to claim 1, a tapered surface is formed by chamfering a corner of the cylindrical magnet portion of the rotor where an upper surface and an inner peripheral surface meet.

In the electric motor according to claim 3 in the present invention, in addition to claim 1 or 2, the board is formed in a rectangular shape with a short side length smaller than an outer diameter or an internal diameter of the magnet portion of the rotor.

Effects of the Invention

According to the invention set forth in claim 1, the connecting portion of the board and the lead wire is formed at the position on the inner side of the axial projection plane of the magnet portion of the rotor above the board. Thus, even when the rotor is increased in diameter, a distance can be ensured between the connecting portion and the magnet portion of the rotor. As a result, the risk of causing a short-circuit or a spark can be avoided.

According to the invention set forth in claim 2, the corner of the cylindrical magnet portion of the rotor where the upper surface and the inner peripheral surface meet is chamfered, forming a tapered surface. Thus, even when the connecting portions 19 and the magnet portion of the rotor 12 are proximate to each other, an insulating distance as much as the chamfered portion can be ensured. Thus, the risk of causing a short-circuit or a spark can be avoided.

According to the invention set forth in claim 3, the board is formed in a substantially rectangular shape of which the short side length is smaller than the outer diameter or internal diameter of the magnet portion of the rotor. Thus, material cost can be reduced by savings in material, and yield can be increased.

DESCRIPTION OF EMBODIMENTS

An electric motor in the present invention includes: a rotating shaft; a rotor securely attached to the rotating shaft and including a cylindrical magnet portion; a stator formed in an annular shape on an outer peripheral side of the rotor; a board installed above the rotor and the stator with a predetermined air gap therefrom; and a lead wire connected to the board, wherein a connecting portion of the board and the lead wire is formed at a position on an inner side of an axial projection plane of the magnet portion of the rotor above the board. The details are explained below.

Embodiment 1

Figure 1:
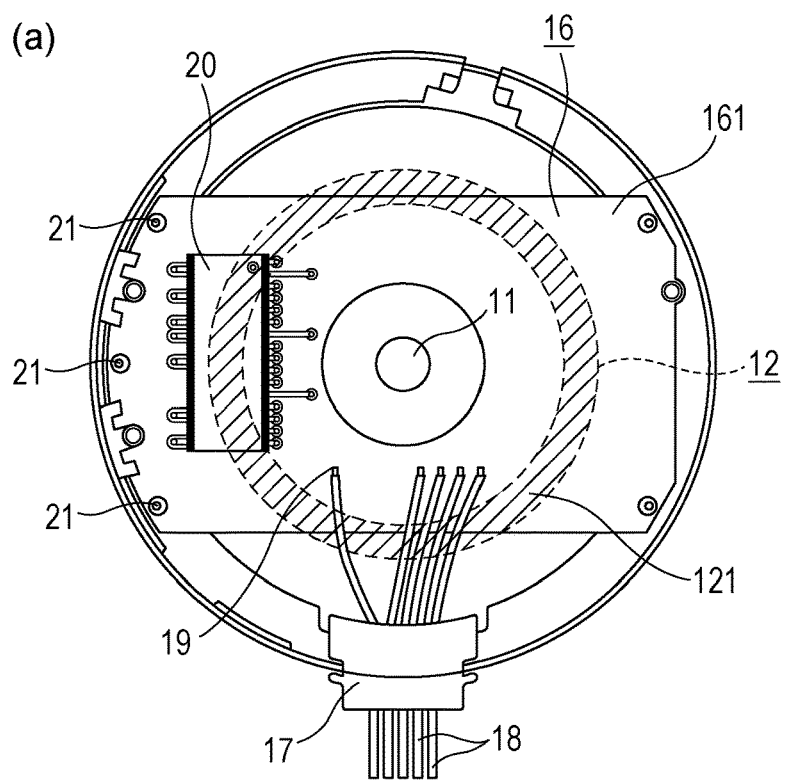
FIG. 1 illustrates a configuration of an electric motor according to the present invention, where (a) is a plan view thereof in a state in which an upper lid 22 is detached, (b) is a cross section view thereof in a state in which the upper lid 22 is attached.
Figure 1:
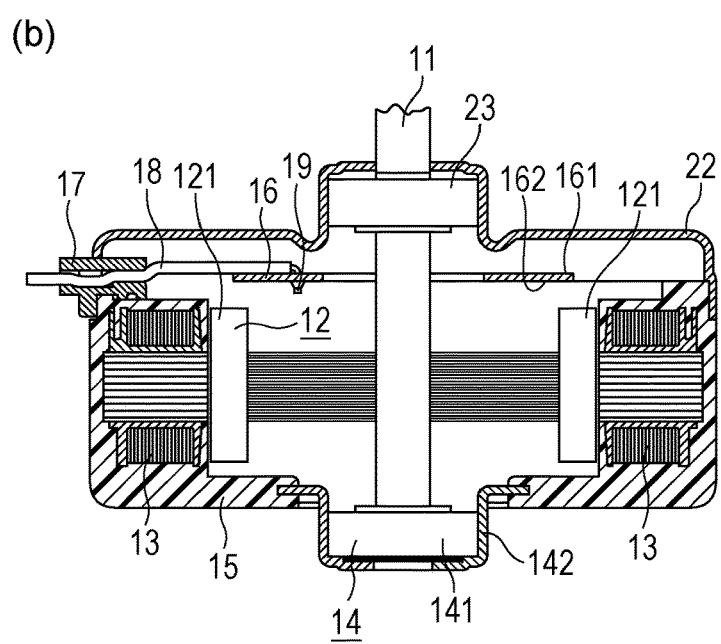

An embodiment of the electric motor according to the present invention will be described with reference to the drawings. FIG. 1 illustrates a configuration of the electric motor according to the present invention, where (a) illustrates a plan view in a state in which an upper lid 22 is detached, and (b) illustrates a cross section view in a state in which the upper lid 22 is attached. The electric motor illustrated in FIGS. 1(a) and (b) is of a radial air gap type. In the radial air gap electric motor, a rotor 12 formed of a cylindrical permanent magnet is disposed on an inner peripheral side relative to a rotating shaft 11, and a doughnut-shaped stator 13 is disposed on an outer peripheral side relative thereto.

Figure 3:
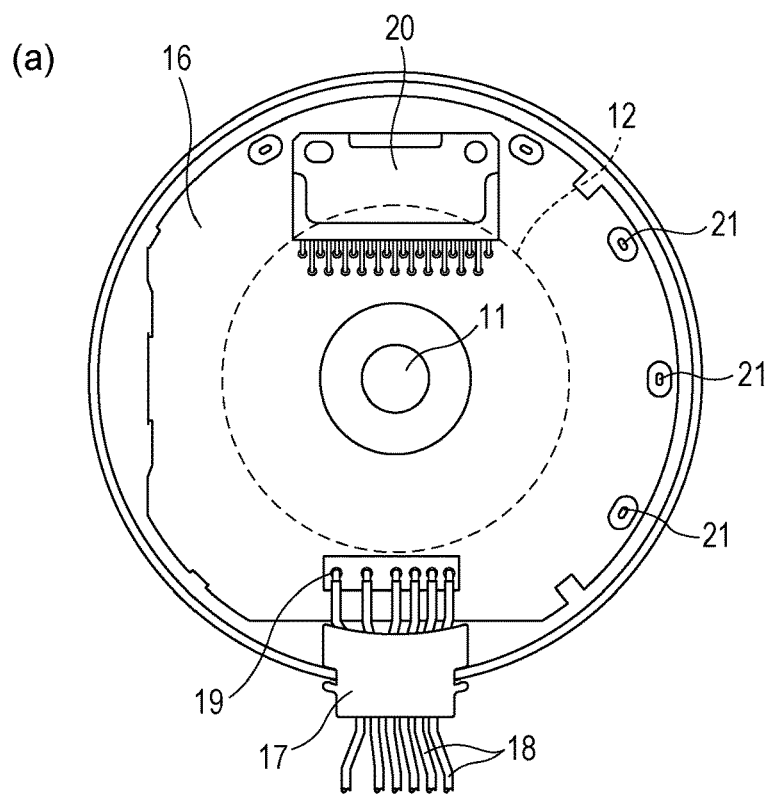
FIG. 3 illustrates a configuration of an electric motor according to the conventional art, where (a) is a plan view thereof and (b) is a cross section view thereof.
Figure 3:
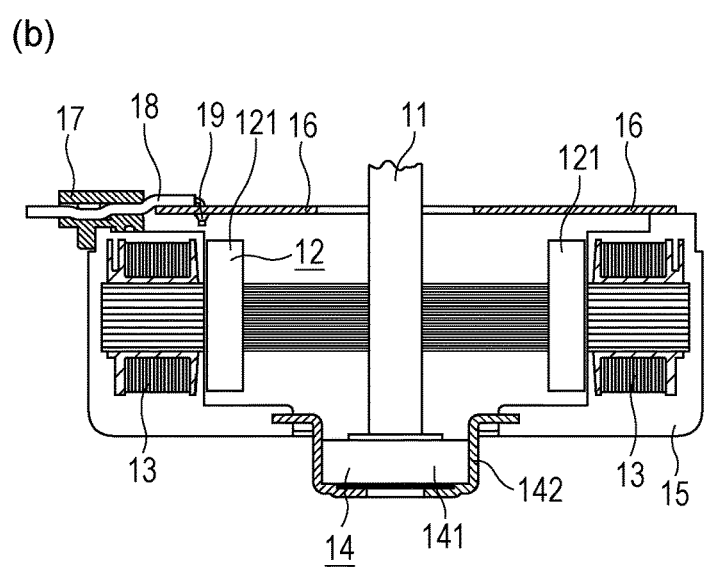
Figure 4:
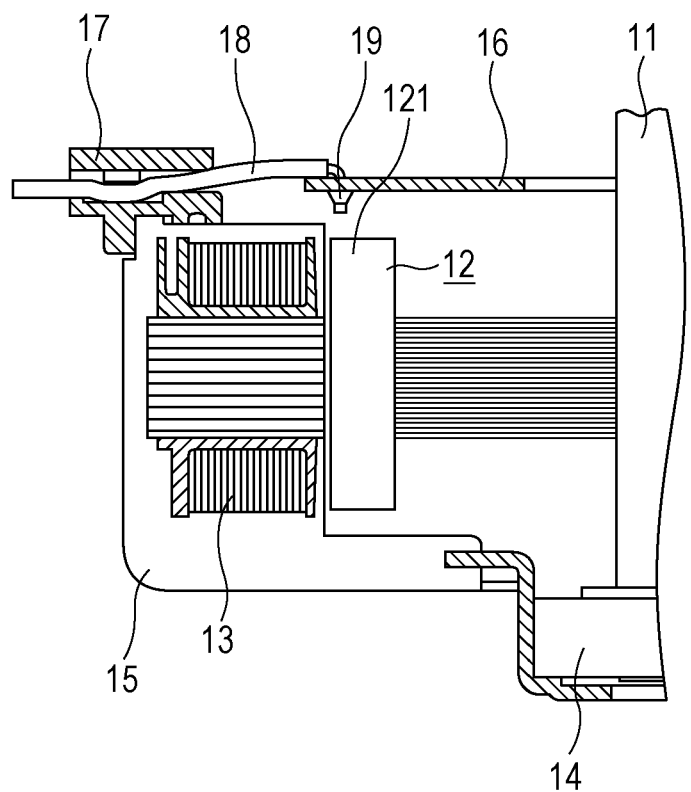
FIG. 4 is a partial cross section view of the conventional electric motor where the outer diameter of the rotor 12 is increased without changing the outer dimensions of the motor.

As illustrated in FIG. 1(b), a bearing portion 14 for securing the rotating shaft 11 includes a ball bearing 141 and a bearing housing 142. The ends of the bearing housing and the entire annular stator 13 are integrally molded and secured with a synthetic resin 15. The ball bearing 141 is press-fit in the rotating shaft 11, which is press-fit in the rotor 12 and thus integrally formed with the rotor 12. The ball bearing 141 is further inserted into the bearing housing 142. Thus, the magnet portion 121 of the rotor 12 is disposed proximate to and opposite the inner side of the annular stator 13. In this state, the board 16 is disposed from above, as illustrated in FIGS. 3(a) and (b). On the board 16, there are formed a wiring pattern for supplying electric power to a control IC 20 disposed on the board 16, and a wiring pattern for supplying electric power to the windings of the stator 13 via the control IC 20. To the board 16, lead wires 18 bundled by a bushing 17 secured on an outer peripheral portion of an upper part of the stator 13 is connected by soldering or the like. The lead wires 18 allow electric power to be supplied to the electric motor. When a three-phase alternating-current system is used as an electric motor driving system, for example, three electrodes for U phase, V phase, and W phase are necessary. Thus, as illustrated in FIG. 1(a), three terminals 21 connecting the stator 13 and the board 16 are formed at the edge of the board 16. The connecting portions 19 and the terminals 21 are connected by the wiring patterns on the board 16. After the board 16 is installed, an upper lid 22 is placed. The upper lid 22 includes another bearing portion 23. When placing the upper lid 22, the rotating shaft 11 is secured by the bearing portion 23.

A characteristic configuration of the present invention is that the connecting portions 19 of the lead wires 18 to the board 16 are located on the inner side of an axial projection plane of the magnet portion 121 of the rotor 12 above the board 16. Namely, as illustrated in FIG. 1(a), the connecting portions 19 are disposed on the inner side of the magnet portion 121, indicated by broken lines, of the rotor 12 as viewed in plan. Specifically, compared with the conventional configuration illustrated in FIG. 3, the lead wires 18 extending from the bushing 17 are elongated to pass across the cylindrical magnet portion 121 of the rotor 12. The connecting portions 19 are disposed at a location on the board 16 which is on the inner side of the axial projection plane of the magnet portion 121 of the rotor 12. Thus, even when the rotor 12 is increased in diameter and the space above the stator 13 is decreased, a distance can be ensured between the connecting portions 19 and the magnet portion 121 of the rotor 12. Thus, the risk of causing a short-circuit or a spark can be avoided.

In the embodiment illustrated in FIG. 1, the lead wires 18 pass on the upper side of the board 16 (the side of a board upper surface 161). The ends of the lead wires 18 pass through prefabricated through-holes in the board 16 and soldered on the lower side of the board 16, but not limited thereto. Alternatively, the lead wires 18 may pass on the lower side (the side of a board lower surface 162) of the board 16 and may be soldered on the upper side of the board 16 as long as the lead wires 18 do not affect the rotation of the rotor 12. In this case, however, the length of the lead wires 18 will be increased compared with the conventional one. Thus, it is desirable to pass and secure the lead wires 18 on the upper side of the board 16 from the viewpoint of preventing the lead wires 18 from coming into contact with the rotor 12 by drooping or the like.

The connecting portions 19 are disposed on the inner side of the magnet portion 121 of the rotor 12. Thus, as illustrated in FIG. 1(a), the size of the board 16 can be decreased compared with the conventional one. In the case of the conventional example illustrated in FIG. 3, the board 16 is secured by clearing the location where the bushing 17 is attached. In addition, the board 16 is elongated close to the bushing 17, with the connecting portions 19 disposed above the stator 13. Thus, the board 16 has a substantially circular shape with a large board area, resulting in poor yield. However, according to the present invention, the connecting portions 19 are disposed on the inner side of the magnet portion 121 of the rotor 12. In this configuration, it is not necessary to dispose the edge of the board 16 near the bushing 17. Thus, as illustrated in FIG. 1(a), the board 16 can be formed in a substantially rectangular shape, reducing its size. Because the board 16 can be formed in a substantially rectangular shape, the board area is decreased compared with the conventional one. As a result, yield is improved and cost reduction can be achieved. While the short side portions for securing the board 16 include an arc shape, as illustrated FIG. 1(a), the term "substantially rectangular shape" is used because the arc width is narrowed and straight line approximation is enabled by decreasing the board area compared with the conventional one.

In FIG. 1(a), the board 16 is formed in the substantially rectangular shape of which the short side length (vertical width in the drawing) is smaller than the outer diameter of the magnet portion 121 of the rotor. The board can be formed with such width because the connecting portions 19 of the lead wires 18 to the board 16 are formed at the position on the inner side of the axial projection plane of the magnet portion 121 of the rotor 12 above the board 16. The board 16 may be formed in a substantially rectangular shape of which the short side length is smaller than the internal diameter of the magnet portion 121 of the rotor 12 if the connecting portions 19 can be formed at a position closer to the rotating shaft 11.

As described above, in the electric motor according to the present invention, the connecting portions 19 of the lead wires 18 to the board 16 is positioned on the inner side of the axial projection plane of the magnet portion 121 of the rotor 12 above the board 16. Thus, a distance can be ensured between the connecting portions 19 and the magnet portion 121 of the rotor 12, whereby the risk of causing a short-circuit or a spark can be avoided.

Further, the restriction of having to dispose the connecting portions 19 above the stator 13 is eliminated. Thus, the board 16 can be reduced in size and formed in a substantially rectangular shape as illustrated in FIG. 1. Thus, material cost can be reduced by savings in material, and yield can be improved.

Embodiment 2

In embodiment 1, the risk of causing a short-circuit or a spark is avoided by ensuring a sufficient distance between the connecting portions 19 of the lead wires 18 to the board 16 and the magnet portion 121 of the rotor 12. However, depending on restrictions posed by the location of the wiring patterns or the control IC 20, for example, a sufficient distance between the connecting portions 19 of the lead wires 18 and the magnet portion 121 of the rotor 12 may not be ensured. As a result, the connecting portions 19 and the magnet portion 121 of the rotor 12 may be proximate to each other.

Figure 2:
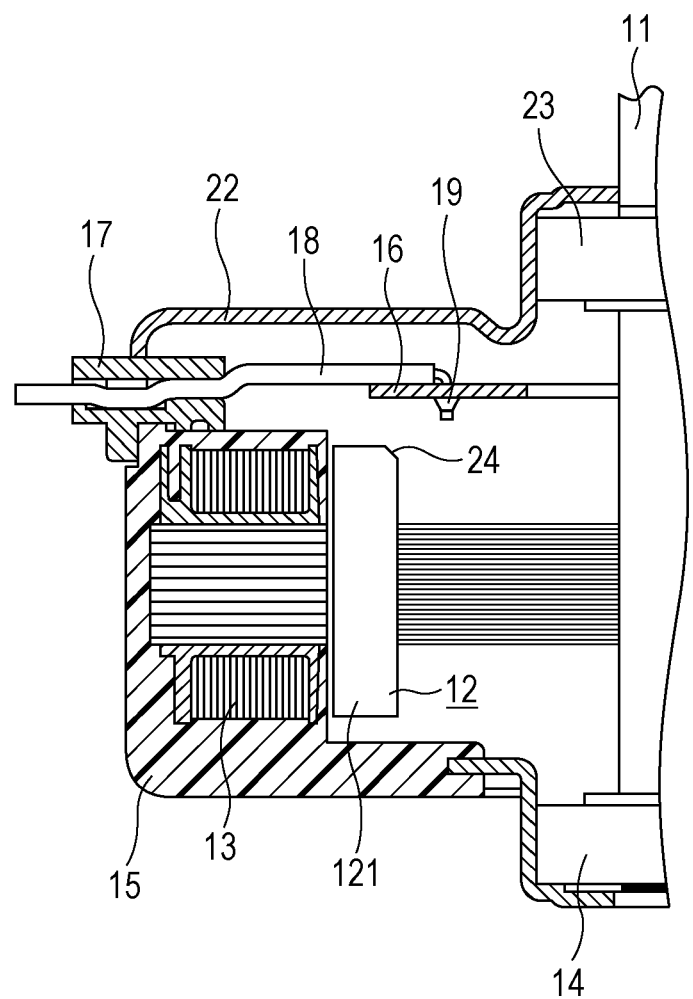
FIG. 2 is a partial cross section view illustrating a configuration of embodiment 2 of an electric motor of the present invention.

Thus, as illustrated in FIG. 2, a tapered surface 24 is formed by chamfering the corner of the cylindrical magnet portion 121 of the rotor 12 at which the upper surface and the inner peripheral surface meet. The formation of the tapered surface 24 can ensure an insulating distance as much as the chamfered portion even when the connecting portions 19 and the magnet portion 121 of the rotor 12 are proximate to each other. In this way, the risk of causing a short-circuit or a spark can be avoided.

According to the present embodiment, the board 16 is formed such that the rotating shaft 11 is positioned at the center. However, the present invention is not limited to such embodiment. Alternatively, the board 16 may be formed such that the center of the board is displaced from the rotating shaft 11.

In the foregoing, an arrangement has been described with reference to FIG. 1 where the line connecting the installed position of the bushing 17 and the center of the rotating shaft 11 is substantially orthogonal to the long sides of the board 16. However, the present invention is not limited to such embodiment. Alternatively, the formation of the board 16 into a substantially rectangular shape allows the outer peripheral portion, which is located above the stator 13 and out of the board 16, to be remained wider than the conventional one. Thus, the installed position of the bushing 17 is not limited to the example of FIG. 1, and has a high degree of freedom in installation position. The wiring patterns formed on the board 16 also has a high degree of freedom in design.

DESCRIPTION OF REFERENCE SIGNS

11 . . . Rotating shaft, 12 . . . Rotor, 13 . . . Stator, 14 . . . Bearing portion, 141 . . . Ball bearing, 142 . . . Bearing housing, 15 . . . Synthetic resin, 16 . . . Board, 161 . . . Board upper surface, 161 . . . Board lower surface, 17 . . . Bushing, 18 . . . Lead wire, 19 . . . Connecting portion, 20 . . . Control IC, 21 . . . Terminal, 22 . . . Upper lid, 23 . . . Bearing portion, 24 . . . Tapered surface

The invention claimed is:

1. An electric motor comprising:
a rotating shaft;
a rotor securely attached to the rotating shaft and including a cylindrical magnet;
a stator formed in an annular shape on an outer peripheral side of the rotor;
a board installed above the rotor and the stator with a predetermined air gap therefrom; and
a lead wire connected to the board,
wherein a plurality of connecting portions connecting the board and the lead wire are formed, all of the plurality of connecting portions being formed at a position on an inner side of an axial projection plane of the magnet of the rotor above the board,
the cylindrical magnet is connected to the rotating shaft by a single member having an upper end and an lower end, the upper end of the single member being closer to the board than the lower end of the single member is,
the cylindrical magnet has an upper end and an lower end, the upper end of the cylindrical magnet being closer to the board than the lower end of the cylindrical magnet is,
the upper end of the single member is lower in a direction of an axis of the rotating shaft than the upper end of the cylindrical magnet,
the board has a through-hole passing from an upper surface to a lower surface of the board, the lower surface being closer to the upper end of the cylindrical magnet than the upper surface of the board is,
the lead wire passes through the through-hole in the board,
an end of the lead wire is electrically connected to the board on the lower surface of the board,
the upper surface of the board has a substantially rectangular shape, a length of a short side of the substantially rectangular shape being smaller than an outer diameter of the magnet of the rotor, and
the stator is integrally molded with a synthetic resin.

2. The electric motor according to claim 1, wherein a tapered surface is formed by chamfering a corner of the cylindrical magnet portion of the rotor where an upper surface and an inner peripheral surface meet.

3. The electric motor according to claim 2, wherein the lead wire is connected to the board via an upper side of the board.

4. The electric motor according to claim 1, wherein a tapered surface is formed by chamfering a corner of the cylindrical magnet where an upper surface, in the direction of the axis of the rotating shaft, of the cylindrical magnet and an inner peripheral surface of the cylindrical magnet meet.

5. The electric motor according to claim 1, wherein the all of the plurality of the connecting portions are disposed at a position closer to the rotating shaft than an outer circumference of the single member as viewed in a plane perpendicular to the axis of the rotating shaft.

6. The electric motor according to claim 1, wherein a length of the board in a direction perpendicular to the direction of the axis of the rotating shaft is smaller than an internal diameter of the cylindrical magnet.

7. An electric motor comprising:
a rotating shaft;
a rotor securely attached to the rotating shaft and including a cylindrical magnet;
a stator formed in an annular shape on an outer peripheral side of the rotor;
a board installed above the rotor and the stator with a predetermined air gap therefrom; and
a plurality of lead wires, each of the plurality of lead wires being connected to the board at each of a plurality of connecting portions;
wherein all of the plurality of connecting portions are disposed at a position closer to the rotating shaft than an inner circumference of the cylindrical magnet as viewed in a plane perpendicular to an axis of the rotating shaft,
the board has a through-hole passing from an upper surface to a lower surface of the board, the lower surface being closer to the cylindrical magnet in a direction of the axis of the rotating shaft than the upper surface of the board is,
the lead wire passes through the through-hole in the board,
an end of the lead wire is electrically connected to the board on the lower surface of the board,
in a cross-section of the electric motor that is parallel to the direction of the axis of the rotating shaft, a length of the board in a direction perpendicular to the direction of the axis of the rotating shaft is smaller than an outer diameter or an internal diameter of the cylindrical magnet,
the board has a surface perpendicular to the direction of the axis of the rotating shaft, and
the surface of the board has two linear sides perpendicular to the direction of the axis of the rotating shaft.

8. The electric motor according to claim 7, wherein the length of the board in the direction perpendicular to the direction of the axis of the rotating shaft is smaller than the internal diameter of the cylindrical magnet.

9. The electric motor according to claim 7, wherein the stator is integrally molded with a synthetic resin.

10. An electric motor comprising:
a rotating shaft;
a rotor securely attached to the rotating shaft and including a cylindrical magnet;
a stator formed in an annular shape on an outer peripheral side of the rotor;
a board installed above the rotor and the stator with a predetermined air gap therefrom; and
a lead wire connected to the board,
wherein a connecting portion of the board and the lead wire is formed at a position on an inner side of an axial projection plane of the cylindrical magnet above the board,
in a cross-section of the electric motor that is parallel to a direction of an axis of the rotating shaft, a length of the board in a direction perpendicular to the direction of the axis of the rotating shaft is smaller than an outer diameter of the cylindrical magnet,
the board has a surface perpendicular to the direction of the axis of the rotating shaft, and
the surface of the board has two linear sides perpendicular to the direction of the axis of the rotating shaft.

11. The electric motor according to claim 10, wherein the board has a through-hole passing from an upper surface to a lower surface of the board, the lower surface being closer to the cylindrical magnet in the direction of the axis of the rotating shaft than the upper surface of the board is,
the lead wire passes through the through-hole in the board,
an end of the lead wire is electrically connected to the board on the lower surface of the board, and
the stator is integrally molded with a synthetic resin.

12. The electric motor according to claim 10, wherein the stator is integrally molded with a synthetic resin.

13. The electric motor according to claim 10, wherein the surface of the board has a substantially rectangular shape.

14. The electric motor according to claim 10, wherein the surface of the board has a rectangular shape.

* * * * *